United States Patent [19]
Hutchison et al.

[11] Patent Number: 5,363,035
[45] Date of Patent: * Nov. 8, 1994

[54] PHASE CONTROLLED TRANSFORMER

[75] Inventors: Richard M. Hutchison, New London; Don J. Corrigall, Appleton, both of Wis.

[73] Assignee: Miller Electric Mfg. Co., Appleton, Wis.

[*] Notice: The portion of the term of this patent subsequent to Feb. 16, 2010 has been disclaimed.

[21] Appl. No.: 954,300

[22] Filed: Sep. 30, 1992

Related U.S. Application Data

[63] Continuation-in-part of Ser. No. 661,471, Feb. 26, 1991, Pat. No. 5,187,428.

[51] Int. Cl.$^5$ .............................................. G05F 1/34
[52] U.S. Cl. .................................... 323/254; 323/250; 323/302; 323/331; 323/339; 336/165; 336/215; 219/130.1

[58] Field of Search ............... 323/248, 250, 254, 302, 323/331, 339, 345; 336/116, 160, 165, 215; 219/121.34, 130.1, 130.51, 137 PS

[56] References Cited

U.S. PATENT DOCUMENTS

| | | | |
|---|---|---|---|
| 3,596,038 | 7/1971 | Hockenberry et al. | 336/165 |
| 4,177,418 | 12/1979 | Brueckner et al. | 336/160 |
| 4,414,491 | 11/1983 | Elliott | 315/282 |
| 4,737,704 | 4/1988 | Kalinnikov et al. | 336/165 |
| 4,876,638 | 10/1989 | Silva et al. | 323/250 |
| 4,994,952 | 2/1991 | Silva et al. | 336/73 |

Primary Examiner—Jeffrey L. Sterrett
Attorney, Agent, or Firm—Foley & Lardner

[57] ABSTRACT

An operator controllable transformer having a shunt magnetic path with a control coil is provided. The transformer includes phase control circuitry to control the output of the transformer by phase controlling current flow in the shunt coil, thereby controlling the flux through the shunt magnetic path and the flux coupling with the secondary coil. Power for the control circuitry is derived from the current induced in the shunt coil.

14 Claims, 5 Drawing Sheets

PHASE CONTROLLED TRANSFORMER

RELATED APPLICATION

This application is a continuation in part of Ser. No. 07/661,471, entitled Shunt Coil Controlled Transformer, filed Feb. 26, 1991, now U.S. Pat. No. 5,187,428.

BACKGROUND OF THE INVENTION

1. Technical Field

The present invention relates generally to transformers and, in particular, to phase controlled transformers used in ac or dc arc welding power supplies or other applications where it is desirable to control the output of a transformer.

BACKGROUND ART

The prior art is replete with methods and devices to control the output of a transformer. Some such devices include the use of switches, such as thyristors, to control the phase of either the input or output power, thereby controlling the transformer output. These devices offer a large control range and typically low power consumption by the control circuit. However, the on/off nature of the control devices drastically disturbs the output waveform. This adversely affects the performance of devices such as welding machines making such devices useful only for specific applications. Moreover, when such a transformer is used in a welder or other high current application, the control circuitry must be capable of handling high current levels, thereby increasing the cost of the equipment.

Other devices utilize a magnetic core as a shunt in the magnetic circuit to decouple the primary and secondary windings and thus control the output power of the transformer. Devices such as these control the flux diverted through the shunt core, thereby controlling the flux through the secondary core and the output of the transformer.

The flux shunted through the shunt core may be controlled by physically moving the shunt core in and out of the magnetic circuit. However, such a mechanical control is not well suited for use with a remote control. Moreover, the forces on a shunt core are sufficient to cause a movable shunt core to vibrate and may create undesirably loud noise.

Another example of a shunt controlled transformer is shown in U.S. Pat. No. 4,177,418 issued to Brueckner et al Dec. 4, 1979. Brueckner discloses a transformer having a two-legged shunt core and a coil wrapped around each leg. The shunt coils are electrically connected in series, but with a reversed polarity, causing the ac current induced in the shunt coils to be in opposite directions and cancel. A switch in series with the shunt coils is opened and closed, selectively allowing dc current to flow through the shunt coils, thereby maintaining the output of the transformer within a predetermined range of a desired level.

The switch in the Brueckner arrangement is part of a control circuit having an independent source of dc power. Moreover, the shunt coils, primary coil, and secondary coil are disclosed as being disposed parallel to one another, thereby increasing the size of the transformer. The shunt coils are also positioned in a plane other than the plane of the primary and secondary coils, further increasing the size of transformer.

Presently known control systems are unsatisfactory in several regards. The waveform of the output of the transformer is often undesirable because the output current goes to zero when the control system is regulating the output. Many require a separate reactor which is expensive, some require a physical construction that is undesirably large, others require expensive high current control components. Accordingly, the need exists for a simplified yet economically efficient electronically controlled transformer.

SUMMARY OF THE INVENTION

In one preferred form, the present invention is directed towards a transformer having a shunt magnetic path and a shunt coil inductively coupled to the shunt magnetic path. A phase controlled switch is powered by and coupled to the shunt coil. The phase controlled switch may be closed for a different portion of the positive half-cycle than the negative half-cycle. The shunt magnetic path may include an air gap.

According to an alternate embodiment, a method for controlling a transformer, that has a main magnetic path which includes a secondary magnetic path, and a shunt coil inductively coupled to a shunt magnetic path with a reluctance greater than the reluctance of the secondary magnetic path is disclosed. The method includes the steps of generating a timing signal and phase controlling the ac current flow induced in the shunt coil. The output of the transformer is responsive to the control of the induced ac shunt current. The ac shunt current may be selectively unbalanced to provide a selectively unbalanced output.

DETAILED DESCRIPTION OF A PREFERRED EXEMPLARY EMBODIMENT

The present invention is directed to the control of a transformer, such as one used to deliver controllable electric power to establish and maintain a welding arc. The illustrated transformer is constructed to provide an amplifying effect wherein changes in a relatively high output current are effected by controlling a relatively low shunt current.

Figure 1:
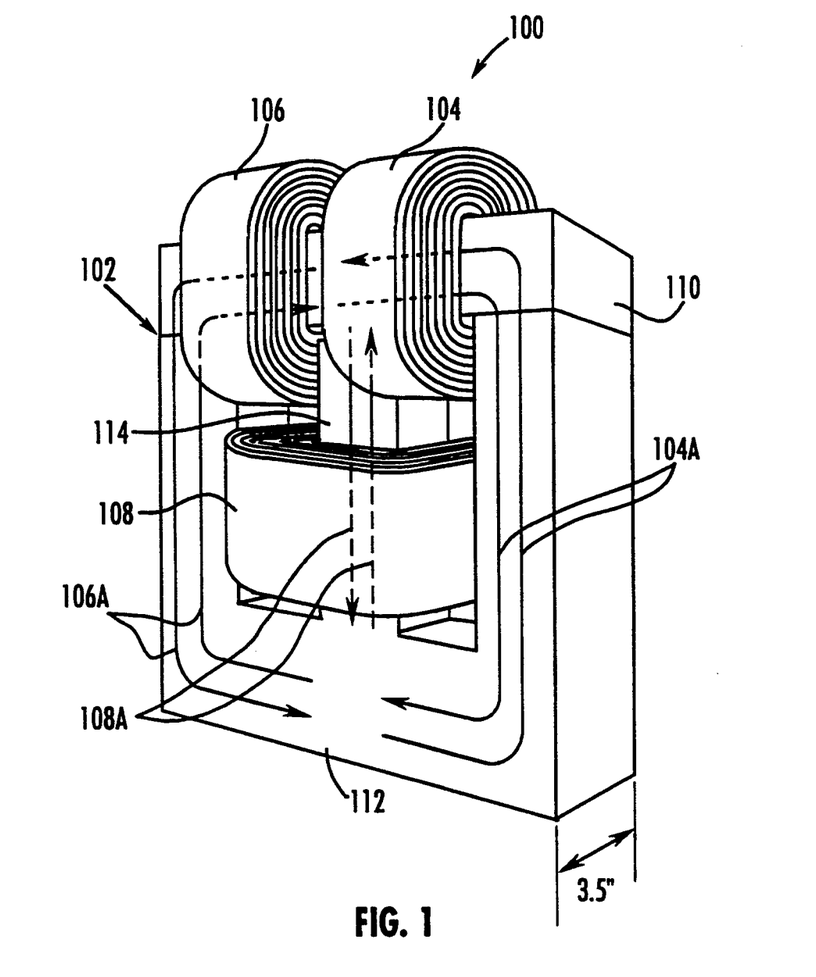
FIG. 1 is a perspective view of a magnetic core and the windings of a transformer constructed according to the present invention.

Referring to FIG. 1, a transformer, designated generally as 100, constructed in accordance with the present invention includes a magnetic core 102, a primary coil 104, a secondary coil 106, and a shunt coil 108. Flux coupling with primary coil 104 follows a primary magnetic path 104A, flux coupling with secondary coil 106 follows a secondary magnetic path 106A, and flux coupling with shunt coil 108 follows a shunt magnetic path 108A. Primary magnetic path 104A and secondary magnetic path 106A together form the main magnetic path of transformer 100. A shunt magnetic path is to flux what a current shunt is to current: a shunt magnetic path diverts flux from the secondary magnetic path, i.e. a flux line will flow from the primary magnetic path to either the secondary magnetic path or the shunt magnetic path. Thus, the flux in a shunt path summed with the flux in a secondary magnetic path is equal to the flux in the primary magnetic path.

Shunt coil 108 is provided to allow the output of transformer 100 to be controlled electronically. More particularly, according to one method of the present invention the high current output of transformer 100 is used in a welding application and is controlled by controlling the induced ac current in shunt coil 108.

When shunt coil 108 is open-circuited, no induced ac current will flow in shunt coil 108 and a relatively large portion of the flux generated by primary coil 104 is shunted along shunt magnetic path 108A, reducing the flux in secondary magnetic path 106A. In other words, coupling between primary coil 104 and secondary coil 106 is poor because of the flux shunted along shunt magnetic path 108A.

However, when shunt coil 108 is close-circuited, the flux generated by primary coil 104 induces an ac current in shunt coil 108. The induced current produces a magnetomotive force ("MMF"), which tends to unbalance the flux components in magnetic core 102. This causes primary coil 104 to attempt to draw additional current to create additional flux sufficient to rebalance the flux and the MMF in magnetic core 102.

The additional flux increases the output of transformer 100 because it is divided between shunt magnetic path 108A and secondary magnetic path 106A. As will be discussed in detail below, the ratio of the flux in secondary magnetic path 106A to the flux in shunt magnetic path 108A, $\Phi_{sec}/\Phi_{shunt}$, is equal to the ratio of the reluctance of shunt magnetic path 108A to the reluctance of secondary magnetic path 106A, $R_{shunt}/R_{sec}$. Transformer 100 is designed such that $R_{shunt}$ is much greater than $R_{sec}$, therefore most of the additional flux follows secondary magnetic path 106A, coupling with secondary coil 106 and increasing the output of transformer 100. Thus, relatively small changes in $\Phi_{shunt}$ effect relatively large changes in $\Phi_{sec}$ and the output of transformer 100, and transformer 100 exhibits an amplifying effect with a gain of approximately $\Phi_{sec}/\Phi_{shunt}$.

In summary, the magnitude of the output of transformer 100 is dependent on the amount of flux following secondary magnetic path 106A. The amount of flux following secondary magnetic path 106A is in turn responsive to the current flow through shunt coil 108. Thus, the output of transformer 100 may be controlled by controlling the current flow through shunt coil 108.

In the preferred embodiment control of the output is achieved by open-circuiting and close-circuiting shunt coil 108 for such times that the desired output is achieved. More particularly, shunt coil 108 is open-circuited at a first selected time in each ac cycle and close-circuited at a second selected time in each ac cycle. Thus, to increase the output of transformer 100 the length of time shunt coil 108 is close-circuited is increased, and to decrease the output of transformer 100 the length of time shunt coil 108 is open-circuited is increased, in either case by adjusting the time at which switching occurs.

In accordance with another aspect of the present invention magnetic core 102 is comprised of a stack of magnetic "I" laminations, collectively and individually referred to as 110, and a stack of magnetic "E" laminations, collectively and individually referred to as 112, the latter having a shunt leg 114. Lamination stacks 110 and 112 are constructed by laminating magnetic plates together in accordance with conventional techniques and consist of any standard magnetic material. The magnetic material should be selected consistent with the concentration of magnetic flux lines and reasonable losses due to cycling of the magnetic domains within the material. Alternatively, magnetic core 102 could be comprised of a ferrite material.

The construction shown in the preferred embodiment of FIG. 1 was selected in order to have primary coil 104 and secondary coil 106 in close proximity to one another. The closeness of this proximity is a determining factor of the maximum output of the transformer. It is obvious to one skilled in the art that other arrangements are possible and more desirable for other applications.

The number of turns and the size of the wire comprising coils 104, 106 and 108 is arrived at using conventional techniques. By way of example, in the embodiment shown, which is intended to be used with a primary voltage of 230 volts at 60 Hz, primary coil 104 is comprised of approximately 130 turns of number 8 AWG (American Wire Gauge) wire, secondary coil 106 is comprised of approximately 30 turns of number 4 AWG wire, and shunt coil 108 is comprised of approximately 250 turns of number 10 AWG wire. Primary coil 104 and secondary coil 106 are wound on "I" lamination stack 110 such that they have a common longitudinal axis of symmetry. Shunt coil 108 is wound about shunt leg 114 such that its longitudinal axis of symmetry is substantially coplanar with and perpendicular to the longitudinal axis of symmetry shared by primary coil 104 and secondary coil 106. Shunt leg 114 is positioned such that the longitudinal axis of symmetry of shunt coil 108 is about equidistant primary coil 104 and secondary coil 106.

Figure 2:
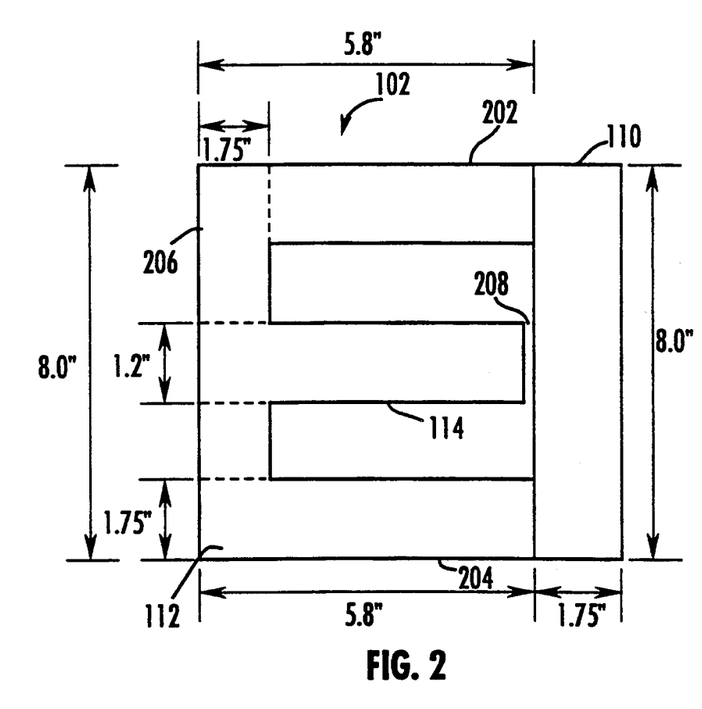
FIG. 2 is a top plan view of a magnetic core of a transformer constructed according to the present invention.

In the embodiment shown "I" lamination stack 110 and "E" lamination stack 112 are suitably comprised of 140 24 gauge electrical steel I and E laminations, respectively, each stack having a height of about 3.5 inches. Referring now to FIG. 2, each "I" lamination 110 has a length of about 8.0 inches and a width of about 1.75 inches. Each "E" lamination 112 includes a pair of side legs 202 and 204, a base 206 and shunt leg 114. Legs 202 and 204, suitably about 5.8 inches long and about 1.75 inches wide are positioned perpendicular to and against "I" lamination stack 110. Base 206 is approximately 8.0 inches in length, about 1.75 inches wide, and substantially perpendicular to legs 114, 202 and 204. Leg 114 is about 1.2 inches wide and about 4.02 inches long, so as to form an air gap 208 between it and "I" lamination stack 110. In the preferred exemplary embodiment air gap 208 is about 0.030 inches in length. Alternatively, air gap 208 could be formed by providing a notch in "I" lamination 110.

As will be explained below, air gap 208, in conjunction with the physical dimensions of magnetic core 102, determines the gain of the amplifier effect, thereby determining the minimum and maximum output current of transformer 100.

As stated above, the magnitudes of the magnetic reluctances of secondary magnetic path 106A and shunt magnetic path 108A determines the relative flux in each path and, therefore, the gain of the amplifier effect. The primary flux, $\Phi_{pri}$, produced by the current in primary coil 104 follows either secondary magnetic path 106A or shunt magnetic path 108A such that $\Phi_{pri}=\Phi_{sec}+\Phi_{shunt}$. Because the MMF, which is $\Phi * R$, across two parallel branches of a magnetic circuit must be equal, the MMF of secondary magnetic path 106A and shunt magnetic path 108A must be equal ($\Phi_{sec} * R_{sec}=\Phi_{shunt} * R_{shunt}$), and the relative flux in each path is inversely proportional to the reluctance. Thus, the gain of the amplifier effect, $\Phi_{sec}/R_{shunt}$, is equal to $R_{shunt}/R_{sec}$.

To obtain the desired gain, the reluctances of secondary magnetic path 106A and shunt magnetic path 108A are tailored by properly selecting their respective cross sectional areas, lengths, and effective permeabilities. $R_{sec}$, the reluctance of secondary magnetic path 106A, is given by $1_{sec}/(\mu_{sec} * A_{sec})$, where $\mu_{sec}$ is the permeability of the material in secondary magnetic path 106A, and $1_{sec}$ and $A_{sec}$ are the mean length and cross sectional area of secondary magnetic path 106A, respectively. Similarly, $R_{shunt}$, the reluctance of shunt magnetic path 108A, including air gap 208, is given by $(1_{shunt}/(\mu_{shunt}*A_{shunt}))+(1_{gap}/(\mu_0*A_{eff}))$ where $1_{shunt}$ is the mean length of shunt magnetic path 108A less the length of air gap 208, $\mu_{shunt}$ is the permeability of the material in the shunt portion of the magnetic circuit, $A_{shunt}$ is the area of shunt leg 114, $1_{gap}$ is the length of air gap 208, $\mu_0$ is the permeability of air, and $A_{eff}$ is the effective area of air gap 208. Because $A_{eff}$, which may be approximated by adding the $1_{gap}$ to the dimensions defining $A_{shunt}$, is approximately equal to $A_{shunt}$ and $\mu_0$ is a constant much less than $\mu_{shunt}$, $R_{shunt}$ is predominantly determined by $1_{gap}$. Thus, by appropriately choosing the length of air gap 208, a desired value of $R_{shunt}$ may conveniently be obtained and, for a given $R_{sec}$, a desired magnetic gain may also be conveniently obtained. Of course, air gap 208 could be filled with any material having a reluctance greater than the reluctance of magnetic core 102. The size of air gap 208, and other physical characteristics of transformer 100, are chosen to provide reluctances in the secondary and shunt paths having a desirable ratio for the purpose of obtaining an output current range of 30 to 180 amps at an output voltage of up to 80 volts and having an acceptable waveform.

The ratio of the shunt reluctance to the secondary reluctance may be tailored to suit a particular application. For example, in the preferred embodiment, described herein which is intended to be used in an arc welding application, the ratio of the shunt reluctance to the secondary reluctance is approximately seven to one.

Figure 3A:
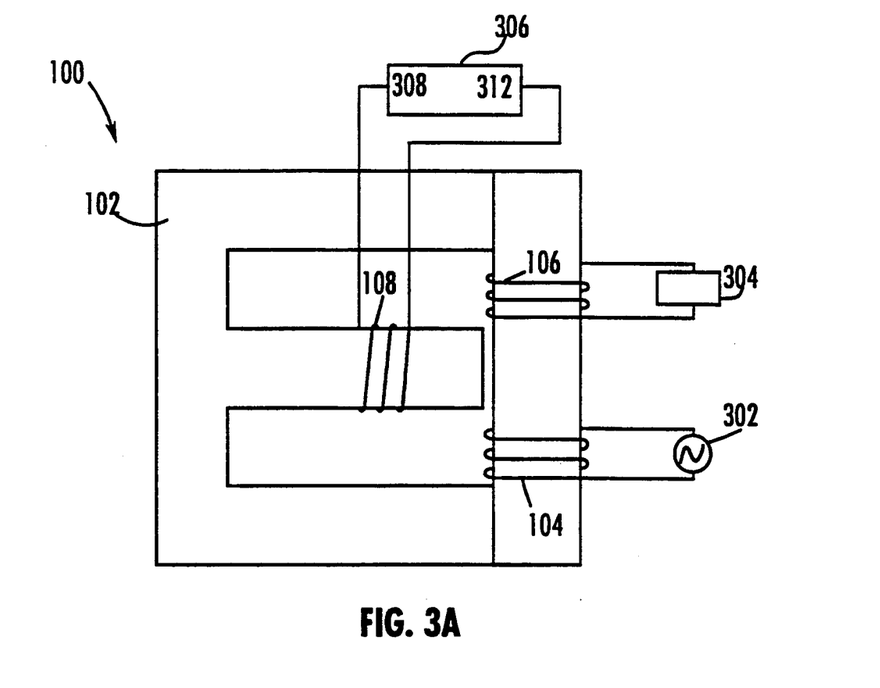
FIGS. 3A and 3B are circuit diagrams of a preferred exemplary embodiment of a transformer made in accordance with the subject invention.
Figure 3B:
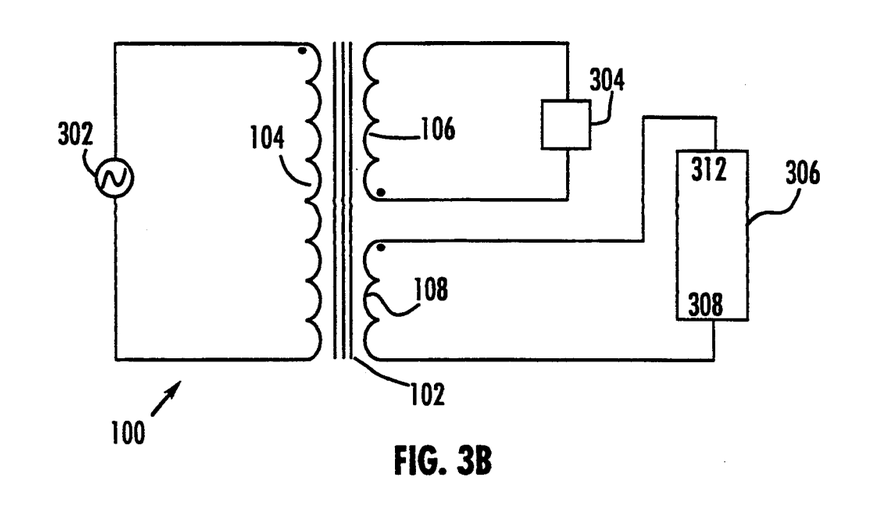

Referring now to FIGS. 3A and 3B, an ac power source 302 and a load 304 are shown in addition to transformer 100 which includes, as well, a switch circuit 306 having terminals 308 and 312. ac power source 302 is connected to primary coil 104 and load 304 is connected to secondary coil 106 in a conventional manner.

Switch circuit 306 controls the output current of transformer 100 by selectively open-circuiting and close-circuiting shunt coil 108. Specifically, a low resistance current path between terminal 308 and terminal 312 is closed at a first selected time in each ac cycle of the waveform induced in shunt coil 108 and opened at a second selected time in each ac cycle of the waveform induced in shunt coil 108. Preferably, the current path between 308 and 312 is an extremely low resistance path when close circuited. Regardless, the time at which the current path is opened and closed determines the current flow in shunt coil 108 and, therefore, the output of transformer 100. The output of transformer 100 is increased by moving the first selected time earlier or moving the second selected time later with respect to the zero crossing of ac voltage induced in the shunt coil 108. Likewise, the output of transformer 100 is decreased by moving the first selected time later or moving the second selected time earlier. As those well skilled in the art will recognize, switch circuit 306 may instead be responsive to other signals such as the waveform on primary coil 104 or an independently generated timing signal, and any timing device that provides a duty cycle may be used to trigger the switching of switch circuit 306.

Alternatively, switch circuit 306 may be responsive to the magnitude of an input signal. Because of the periodic nature of the ac waveform induced on shunt coil 108, responding to the magnitude of the voltage induced on shunt coil 108 will result in switching at a given time in each ac cycle, thereby selecting the relative open and close circuited times.

Figure 3C:
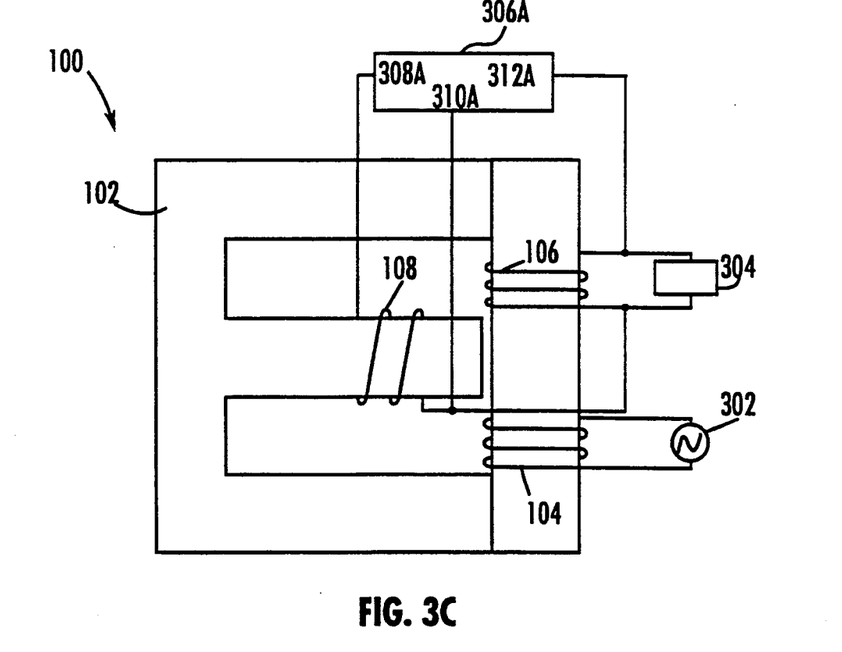
FIGS. 3C and 3D are circuit diagrams of a preferred exemplary embodiment of a transformer used in a welding application made in accordance with the subject invention.
Figure 3D:
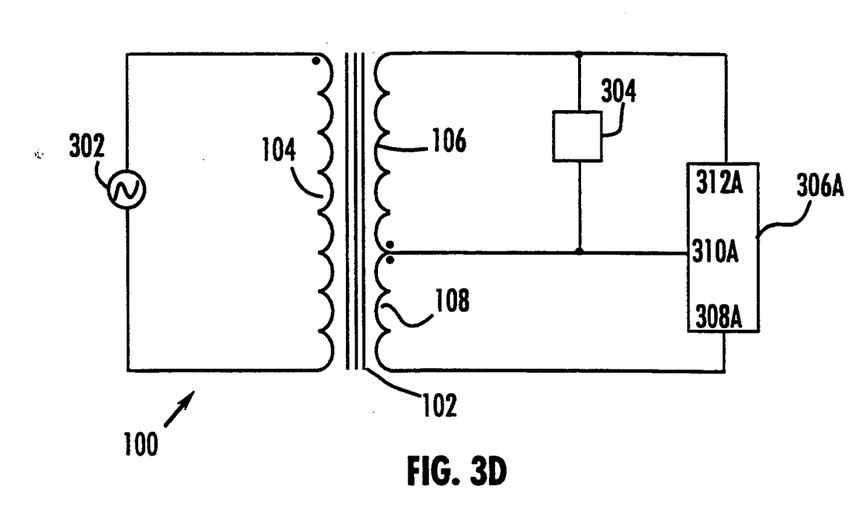

Referring now to FIGS. 3C and 3D, an embodiment of the present invention particularly well suited for arc welding applications is shown. A phase control switch 306A (described in detail below with reference to FIG. 4) includes terminals 308A, 310A and 312A. A current path between terminals 308A and 312A is closed at a predetermined time relative to each zero crossing of the ac waveform applied to terminals 308A and 310A. The current path is opened at each zero crossing of the ac waveform applied to terminals 308A and 310A. The current induced in shunt coil 108 is circulated through load 304, thereby increasing the output power of the transformer. Also, because the current in shunt coil 104 is slightly out of phase with respect to the current in secondary coil 106, the shunt current may be added to the rectified output of the transformer by means of a unidirectional switching device, adding to the stability of the welding arc.

Figure 4:
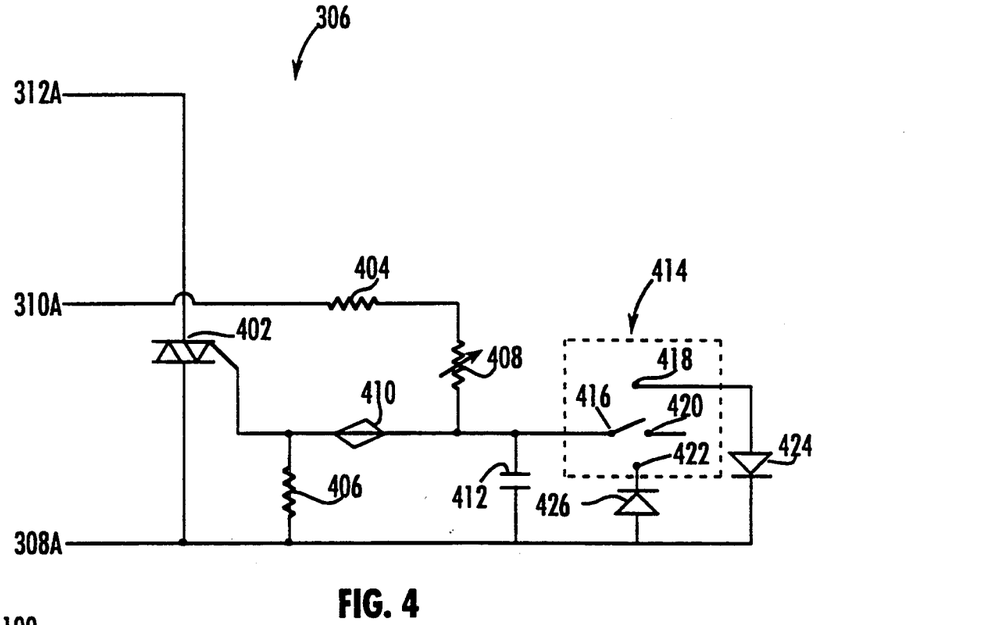
FIG. 4 is a schematic diagram of the switch shown in FIGS. 3C and 3D.

Referring now to FIG. 4, phase control switch 306A provides a virtual short circuit between terminals 308A and 312A at a predetermined time relative to each zero crossing of the waveform applied to terminals 308A and 310A. Specifically, a bi-directional thyristor 402, provided between terminals 308A and 312A, is caused to conduct at a predetermined time in each half cycle of the ac waveform applied to terminals 308A and 310A. Thyristor 402 will continue to conduct until it becomes reverse-biased when the polarity across terminals 308A and 310A reverses. Because the waveform applied to terminals 308A and 310A is periodic, the time at which thyristor 402 begins conducting relative to each zero crossing determines the relative "on" time and "off" time of current flow through shunt coil 108. As stated above, the relative "on" time and "off" time of current flow through shunt coil 108 controls the flux through secondary magnetic path 106A and, therefore, the output of transformer 100.

In the embodiment shown in FIG. 4 the predetermined time in each ac cycle at which thyristor 402 begins conducting is controlled by adjusting the resistance of a variable resistor 408. A capacitor 412 is charged by the voltage difference between terminals 308A and 310A, through variable resistor 408 and a resistor 404. When the voltage on capacitor 412 becomes greater than the triggering threshold of a trigger 410, it sends a timing signal to a resistor 406 and thyristor 402, thereby causing thyristor 402 to conduct. The charging time of capacitor 412, and the time at which thyristor 402 begins conducting, is dependent upon the RC time constant of resistor 404, variable resistor 408 and capacitor 412. Thus, the operator may control the current output by adjusting the resistance of variable resistor 408, which adjusts the RC time constant, thereby controlling the length of time that thyristor 402 conducts. Phase control, i.e. turning the conduction of shunt coil 108 "on" and "off" at least once within each cycle (as opposed to turning the conduction of shunt coil 108 "on" and "off" once over a great number of cycles) allows for quicker response time of the transformer to changing conditions and provides a more uniform output which is better suited for welding and other applications.

Phase control switch 306A is designed to eliminate the need for an independent source of power or reference voltage. The power to turn phase control switch 306A on and off is obtained directly from the voltage induced on shunt coil 108 and no reference voltage is needed because trigger 410 operates on the energy stored in capacitor 412.

The present invention is suitable for welding applications which require a balanced output waveform. A balanced output waveform is obtained by allowing thyristor 402 to conduct for equal portions of both the positive and negative half-cycles of the voltage induced on shunt coil 108.

The present invention is also suitable for welding applications which involve an imbalanced output waveform, such as ac TIG (tungsten inert gas) welding, also called ac GTAW (gas tungsten arc welding). There is an inherent imbalance of the arc voltage in ac TIG welding which results in an imbalance of current. The imbalance of current can have the undesirable effect of creating a flux offset which causes a unidirectional saturation of the transformer core, and a corresponding increase in primary current. By selecting an output waveform that is unbalanced in the opposite polarity of the natural imbalance, this unidirectional saturation will be reduced or eliminated. Such an unbalanced output waveform may be provided by allowing thyristor 402 to conduct more on one half-cycle than on the other. For example, thyristor 402 may conduct on only the positive or negative half-cycle, or thyristor 402 may conduct for a different portion of each positive half-cycle than for each negative half-cycle.

Selection between balanced and unbalanced output waveforms may be made using a selector switch 414, having terminals 416–422. When terminal 416 is connected to terminal 420, capacitor 412 is charged on both the positive and negative halves of the waveform, and thyristor 402 conducts on both positive and negative halves of the waveform. However, when terminal 416 is connected to terminal 422, capacitor 412 is short-circuited by a diode 426 on the negative half of the waveform and charges on only the positive half of the waveform. Similarly, when terminal 416 is connected to terminal 418 capacitor 412 is short-circuited by a diode 424 on the positive half of the waveform and charges on only the negative half of the waveform.

Other phase control schemes may be used: for example, parallel current paths with different resistances for charging capacitor 412 (one path for the positive half-cycle and one path for the negative half-cycle) may be provided. This sort of phase control will provide a variable unbalance.

Figure 5:
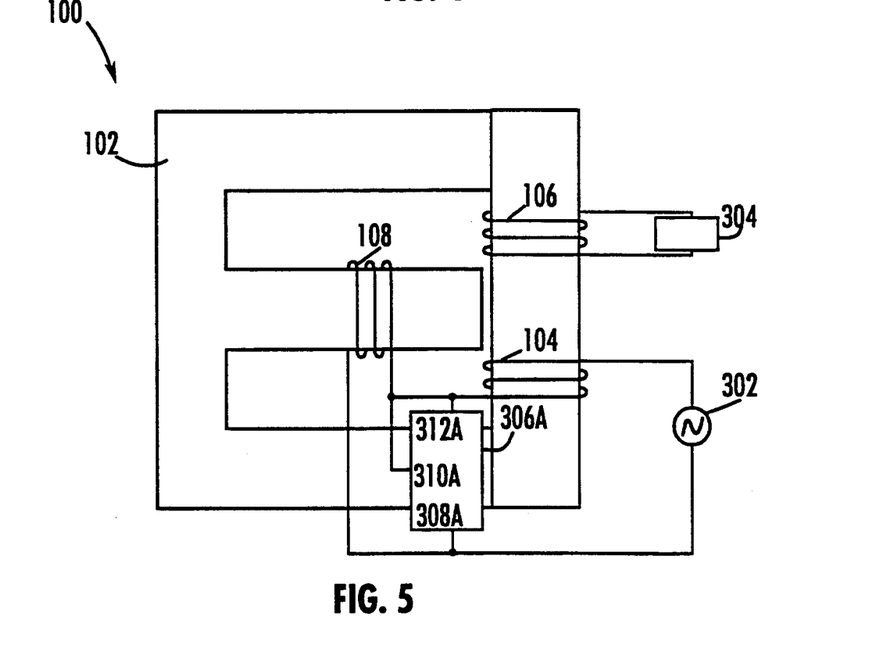
FIG. 5 is a circuit diagram of an alternative exemplary embodiment of a transformer made in accordance with the subject invention.

Phase control switch 306A may be connected in alternative arrangements, such as that shown in FIG. 5. Referring to FIG. 5, shunt coil 108 and primary coil 104 are connected in series when phase control switch 306A is off. When phase control switch is triggered on, by the waveform on shunt coil 108, the current in primary coil 104 bypasses shunt coil 108, and the current in shunt coil 108 bypasses primary coil 104.

Other modifications may be made in the design and arrangement of the elements discussed herein without departing from the spirit and scope of the invention, as expressed in the appended claims.

We claim:

1. A method for controlling a transformer having a main magnetic path, said main magnetic path including a secondary magnetic path, further having a shunt magnetic path with a reluctance greater than the reluctance of the secondary magnetic path and a shunt coil inductively coupled to the shunt magnetic path, the method comprising:

generating a timing signal; and phase controlling a current through said shunt coil and an output of the transformer in response to said timing signal;

wherein said step of phase controlling includes the step of selectively unbalancing said current in said shunt coil.

2. The method of claim 1 wherein said current includes a positive half-cycle and a negative half-cycle and said step of selectively unbalancing includes the steps of:

allowing current to flow in said shunt coil during a first portion of said negative half-cycle; and allowing current to flow in said shunt coil during a second portion of said positive half-cycle, wherein said first portion does not equal said second portion.

3. The method of claim 2 wherein said step of selectively unbalancing includes the step of preventing negative current from flowing in said shunt coil during said negative half-cycle.

4. The method of claim 2 wherein said step of selectively unbalancing includes the step of preventing positive current from flowing in said shunt coil during said positive half-cycle.

5. A controllable transformer comprising:

a primary magnetic path and a primary coil, said primary coil disposed to be inductively coupled to a primary flux in said primary magnetic path;

a secondary magnetic path and a secondary coil, said secondary coil disposed to be inductively coupled to a secondary flux in said secondary magnetic path;

a shunt magnetic path having a shunt reluctance greater than the reluctance of said secondary magnetic path and a shunt coil, said shunt coil disposed to be inductively coupled to a shunt flux in said shunt magnetic path, wherein said primary flux is equal to the secondary flux plus the shunt flux; and a phase controlled switch operatively associated with said shunt coil;

wherein said shunt magnetic path includes an air gap.

6. A controllable transformer comprising:

a main magnetic path, said main magnetic path including a secondary magnetic path;

a shunt magnetic path having a shunt reluctance greater than the reluctance of said secondary magnetic path;

a shunt coil inductively coupled to said shunt magnetic path; and a phase controlled switch operatively associated with said shunt coil;

wherein said phase controlled switch includes means for selectively unbalancing an ac waveform induced in said shunt coil.

7. The controllable transformer of claim 6 wherein said ac waveform includes a positive half-cycle and a negative half-cycle and said phase controlled switch includes means for allowing positive current to flow in said shunt coil for a longer period of time than negative current is allowed to flow in said shunt coil.

8. The controllable transformer of claim 7 wherein said phase controlled switch includes means for preventing positive current from flowing in said shunt coil.

9. The controllable transformer of claim 6 wherein said ac waveform includes a positive half-cycle and a negative half-cycle and said phase controlled switch includes means for allowing positive current to flow in said shunt coil for a shorter period of time than negative current in allowed to flow in said shunt coil.

10. The controllable transformer of claim 9 wherein said phase controlled switch includes means for preventing negative current from flowing in said shunt coil.

11. A controllable transformer comprising:

a primary magnetic path and a primary coil, said primary coil disposed to be inductively coupled to a primary flux in said primary magnetic path;

a secondary magnetic path and a secondary coil, said secondary coil disposed to be inductively coupled to a secondary flux in said secondary magnetic path;

a shunt magnetic path having a shunt reluctance greater than the reluctance of said secondary magnetic path and a shunt coil, said shunt coil disposed to be inductively coupled to a shunt flux in said shunt magnetic path, wherein said primary flux is equal to the secondary flux plus the shunt flux; and a phase controlled switch operatively associated with said shunt coil;

wherein power for control of said phase controlled switch is derived from said shunt coil.

12. A method for controlling a transformer having a primary coil, a secondary coil coupled to a secondary magnetic path, and a shunt coil coupled to a shunt magnetic path with a reluctance greater than the reluctance of the secondary magnetic path, the method comprising:

coupling a primary flux to said primary coil;
coupling a secondary flux to said secondary coil;
coupling a shunt flux to said shunt coil, wherein said shunt flux equals the difference between said primary flux and said secondary flux;
generating a timing signal; and phase controlling a current through said shunt coil and an output of the transformer in response to said timing signal;

further comprising the step of providing a current induced in said shunt coil to the output current of the transformer.

13. A controllable transformer comprising:

a primary magnetic path and a primary coil, said primary coil disposed to be inductively coupled to a primary flux in said primary magnetic path;

a secondary magnetic path and a secondary coil, said secondary coil disposed to be inductively coupled to a secondary flux in said secondary magnetic path;

a shunt magnetic path having a shunt reluctance greater than the reluctance of said secondary magnetic path and a shunt coil, said shunt coil disposed to be inductively coupled to a shunt flux in said shunt magnetic path, wherein said primary flux is equal to the secondary flux plus the shunt flux; and a phase controlled switch operatively associated with said shunt coil;

wherein said phase controlled switch includes means for selectively controlling an output of the transformer by selectively controlling an ac waveform induced in said shunt coil, wherein said ac waveform is controlled on a cycle by cycle basis;

further comprising means for providing a current induced in said shunt coil to an output current of the transformer.

14. A controllable transformer comprising:

a primary magnetic path and a primary coil, said primary coil disposed to be inductively coupled to a primary flux in said primary magnetic path;

a secondary magnetic path and a secondary coil, said secondary coil disposed to be inductively coupled to a secondary flux in said secondary magnetic path;

a shunt magnetic path having a shunt reluctance greater than the reluctance of said secondary magnetic path and a shunt coil, said shunt coil disposed to be inductively coupled to a shunt flux in said shunt magnetic path, wherein said primary flux is equal to the secondary flux plus the shunt flux; and a phase controlled switch operatively associated with said shunt coil; said phase controlled switch including means for selectively controlling an output of the transformer by selectively controlling an ac waveform induced in said shunt coil, wherein said ac waveform is controlled on a cycle by cycle basis;

wherein the transformer includes a primary coil and a secondary coil, said shunt path is about equidistant from said primary coil and said secondary coil, and further wherein said current induced in said shunt coil is provided to said output current such that said current induced in said shunt coil is additive to said output current.

* * * * *